(12) United States Patent
Yahiro et al.

(10) Patent No.: US 8,046,714 B2
(45) Date of Patent: Oct. 25, 2011

(54) METHOD, PROGRAM AND DEVICE FOR DISPLAYING MENU

(75) Inventors: Takao Yahiro, Tokyo (JP); Manae Suwa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 204 days.

(21) Appl. No.: 11/377,775

(22) Filed: Mar. 16, 2006

(65) Prior Publication Data

US 2006/0212828 A1  Sep. 21, 2006

(30) Foreign Application Priority Data

Mar. 17, 2005  (JP) ................. 2005-077796

(51) Int. Cl.
*G06F 3/048* (2006.01)
*G09G 5/10* (2006.01)

(52) U.S. Cl. ........ 715/810; 715/764; 715/835; 715/836; 715/848; 715/850; 715/852; 345/419; 345/653; 345/664; 345/679

(58) Field of Classification Search .................. 715/764, 715/810, 835, 836, 848, 850, 852; 345/419, 345/653, 664, 679

See application file for complete search history.

(56) References Cited

U.S. PATENT DOCUMENTS

| | | | | |
|---|---|---|---|---|
| 5,678,015 A * | 10/1997 | Goh | ............................ | 715/782 |
| 6,121,969 A | 9/2000 | Jain et al. | | |
| 6,466,237 B1 | 10/2002 | Miyao et al. | | |
| 6,836,274 B1 * | 12/2004 | Kikinis | ......................... | 715/716 |
| 6,842,185 B1 * | 1/2005 | Mavrommati et al. | ....... | 715/844 |
| 6,907,575 B2 * | 6/2005 | Duarte | ......................... | 715/784 |
| 7,091,998 B2 * | 8/2006 | Miller-Smith | ................ | 715/810 |
| 7,216,305 B1 * | 5/2007 | Jaeger | ............................ | 715/849 |
| 7,322,009 B2 * | 1/2008 | Kikinis | ......................... | 715/700 |
| 7,581,195 B2 * | 8/2009 | Sciammarella et al. | ...... | 715/838 |
| 7,698,658 B2 * | 4/2010 | Ohwa et al. | ................... | 715/835 |
| 2002/0054158 A1 | 5/2002 | Asami | | |
| 2002/0075257 A1 * | 6/2002 | Chartier et al. | .............. | 345/419 |
| 2004/0100479 A1 | 5/2004 | Nakano et al. | | |
| 2004/0155907 A1 * | 8/2004 | Yamaguchi et al. | .......... | 345/810 |
| 2004/0250217 A1 * | 12/2004 | Tojo et al. | ..................... | 715/810 |
| 2005/0086611 A1 * | 4/2005 | Takabe et al. | ................. | 715/823 |
| 2005/0229102 A1 * | 10/2005 | Watson et al. | ................ | 715/739 |

FOREIGN PATENT DOCUMENTS

| | | |
|---|---|---|
| EP | 1006428 | 6/2000 |
| JP | HEI 4-214595 | 8/1992 |
| JP | 7-114451 | 5/1995 |
| JP | 10260671 | 9/1998 |
| JP | HEI 11-23193 | 8/1999 |

(Continued)

*Primary Examiner* — Steven Sax
*Assistant Examiner* — Grant D Johnson
(74) *Attorney, Agent, or Firm* — Day Pitney LLP (57) ABSTRACT

A menu displaying method for displaying a menu containing a plurality of menu items on a display screen comprises a menu item arrangement step of arranging the menu items in a prescribed three-dimensional virtual body to squarely face the display screen so that each menu item will have at least a viewable part that is not screened by other menu items in front of the menu item and a menu item moving step of moving the menu items arranged in the menu item arrangement step according to a prescribed user operation while keeping the menu items squarely facing the display screen. By the menu displaying method, a large number of menu items can be displayed on a screen while minimizing deterioration of viewability of the menu items.

8 Claims, 5 Drawing Sheets

FOREIGN PATENT DOCUMENTS

| | | |
|---|---|---|
| JP | 2000-105772 | 4/2000 |
| JP | 2003-330586 | 11/2003 |
| JP | 2004-227393 | 8/2004 |
| WO | 0173598 | 10/2001 |

* cited by examiner

METHOD, PROGRAM AND DEVICE FOR DISPLAYING MENU

CROSS REFERENCE TO RELATED APPLICATION

This application claims priority from Japanese Patent Application No. 2005-77796, filed on Mar. 17, 2005, the entire subject matter of which is incorporated herein by reference.

BACKGROUND

The present invention relates to a method, program and device for displaying a menu containing a plurality of menu items.

Electronic devices and information terminals of today generally have a large number of functions and a display screen capable of displaying a menu containing a plurality of menu items representing various functions, etc. Such menu items are arranged on the menu in hierarchical structure, for example. By configuring the menu in hierarchical structure such as tree structure, the number of operations (pressing a scroll key, etc.) for scrolling the menu screen can be reduced and a work area, etc. can easily be reserved on the screen. However, in order to find a desired menu item in such a menu in hierarchical structure, the user has to successively select and refer to a lot of menu levels properly from the top level to lower levels. Such a search is difficult and troublesome to users who are unfamiliar with the hierarchical structure of the particular menu.

Various three-dimensional menu displaying devices/methods, displaying a menu containing a plurality of menu items in a three-dimensional arrangement, have been proposed in order to resolve the above problem and such methods are widely known (see Japanese Patent Provisional Publication No. HEI07-114451 (hereinafter referred to as a "patent document #1"), for example). By displaying a menu in such a three-dimensional arrangement, a large number of menu items can be displayed on the menu screen at once, by which the user is relieved of the troublesome task of the hierarchical search, etc. and is also allowed to grasp correlations among the menu items (e.g. positional relationship among the menu items) with ease.

However, the three-dimensional menu displaying devices, like the one disclosed in the patent document #1, are only capable of displaying half the menu items (half the surfaces) of the whole menu on the menu screen. For example, in cases where the menu is formed in a cubic shape having six surfaces, only menu items on three surfaces of the cube can be displayed at once. Such three-dimensional menu displaying devices, involving the intrinsic restriction on the number of displayed menu items, are insufficient for meeting the users' needs and requirements.

Further, in the technique of the patent document #1, top and side surfaces of the cubic menu (which are viewable on the menu screen together with the front surface of the cubic menu) are placed substantially parallel to a Z direction orthogonal to the menu screen (X-Y plane) or at slight angles from the Z direction, by which each menu item on the top or side surface is shown in an extremely distorted state and in a very small size, resulting in extremely low viewability of the menu items on the top or side surface. By arranging such menu items in parallel with the X-Y plane (menu screen) in two-dimensional arrangement in order to increase their viewability, the distortion can be eliminated and the display size can be increased. However, the number of displayed menu items is restricted further in this arrangement.

SUMMARY

The present invention which has been made in consideration of the above problems is advantageous in that a menu displaying device, capable of displaying a large number of menu items on a screen while minimizing the deterioration of viewability of the menu items, can be provided.

BRIEF DESCRIPTION OF THE ACCOMPANYING DRAWINGS

The objects and features of the present invention will become more apparent from the consideration of the following detailed description taken in conjunction with the accompanying drawings.

DETAILED DESCRIPTION

General Overview

In accordance with an aspect of the present invention, there is provided a menu displaying method for displaying a menu containing a plurality of menu items on a display screen, comprising: a menu item arrangement step of arranging the menu items in a prescribed three-dimensional virtual body to squarely face the display screen so that each menu item will have at least a viewable part that is not screened by other menu items in front of the menu item; and a menu item moving step of moving the menu items arranged in the menu item arrangement step according to a prescribed user operation while keeping the menu items squarely facing the display screen.

The menu item moving step may be configured to move each menu item on a circular orbit around a prescribed axis in the three-dimensional virtual body.

The menu item moving step may be configured to move each menu item along a prescribed virtual surface of the three-dimensional virtual body.

The menu item moving step may be configured to discretely move each menu item to a position of an adjacent menu item substantially along a virtual surface of the three-dimensional virtual body.

The menu displaying method may further comprise a menu item selectability setting step of setting each menu item in a selectable state or a non-selectable state depending on the size of the menu item displayed on the display screen. The menu item selectability setting step may be configured to set each menu item in the selectable state or the non-selectable state depending on whether or not the menu item has a prescribed size enough for letting a user select the menu item easily and securely.

The menu displaying method may further comprise: an icon displaying step of displaying an icon, as an input key to be operated by a user for specifying the movement of the menu items, on the display screen; and an icon moving step of moving the icon displayed on the display screen according to the operation by the user to the icon. In this case, the menu item moving step may move the menu items in sync with the movement of the icon by the icon moving step.

In accordance with another aspect of the present invention, there is provided a menu displaying method for displaying a menu containing a plurality of menu items on a display screen, comprising: a menu item arrangement step of arranging the menu items in a prescribed three-dimensional virtual body to squarely face the display screen so that each menu item will have at least a viewable part that is not screened by other menu items in front of the menu item; and a menu item moving step of constantly moving the menu items arranged in the menu item arrangement step on prescribed orbits while keeping the menu items squarely facing the display screen.

Aspects of the invention may be implemented in computer software as programs storable on computer-readable media including but not limited to RAMs, ROMs, flash memory, EEPROMs, CD-media, DVD-media, temporary storage, hard disk drives, floppy disks, permanent storage, and the like.

In accordance with another aspect of the present invention, there is provided a menu displaying device which displays a menu containing a plurality of menu items on a display screen, comprising: a display unit capable of displaying the menu on the display screen as a three-dimensional menu; a menu item arrangement unit which arranges the menu items in a prescribed three-dimensional virtual body to squarely face the display screen so that each menu item will have at least a viewable part that is not screened by other menu items in front of the menu item; and a menu item moving unit which moves the menu items arranged by the menu item arrangement unit according to a prescribed user operation while keeping the menu items squarely facing the display screen.

The menu item moving unit may be configured to move each menu item on a circular orbit around a prescribed axis in the three-dimensional virtual body.

The menu item moving unit may be configured to move each menu item along a prescribed virtual surface of the three-dimensional virtual body.

The menu item moving unit may be configured to discretely move each menu item to a position of an adjacent menu item substantially along a virtual surface of the three-dimensional virtual body.

The menu displaying device may further comprise a menu item selectability setting unit which sets each menu item in a selectable state or a non-selectable state depending on the size of the menu item displayed on the display screen. The menu item selectability setting unit may be configured to set each menu item in the selectable state or the non-selectable state depending on whether or not the menu item has a prescribed size enough for letting a user select the menu item easily and securely.

The menu displaying device may further comprise: an icon displaying unit which displays an icon, as an input key to be operated by a user for specifying the movement of the menu items, on the display screen; and an icon moving unit which moves the icon displayed on the display screen according to the operation by the user to the icon. In this case, the menu item moving unit may move the menu items in sync with the movement of the icon by the icon moving unit.

In accordance with another aspect of the present invention, there is provided a menu displaying device which displays a menu containing a plurality of menu items on a display screen, comprising: a display unit capable of displaying the menu on the display screen as a three-dimensional menu; a menu item arrangement unit which arranges the menu items in a prescribed three-dimensional virtual body to squarely face the display screen so that each menu item will have at least a viewable part that is not screened by other menu items in front of the menu item; and a menu item moving unit which constantly moves the menu items arranged by the menu item arrangement unit on prescribed orbits while keeping the menu items squarely facing the display screen.

By the menu displaying methods, computer program products and menu displaying devices in accordance with the present invention, menu items having high viewability can be displayed on one screen in a large number, by which the user is allowed to visually and intuitively grasp and recognize the correlations among the menu items with ease, for example.

Embodiments

Referring now to the drawings, a description will be given in detail of preferred embodiments in accordance with the present invention. In the following, the composition and effects of a vehicle-mounted system equipped with a menu displaying device in accordance with an embodiment of the present invention will be described in detail.

Figure 1:
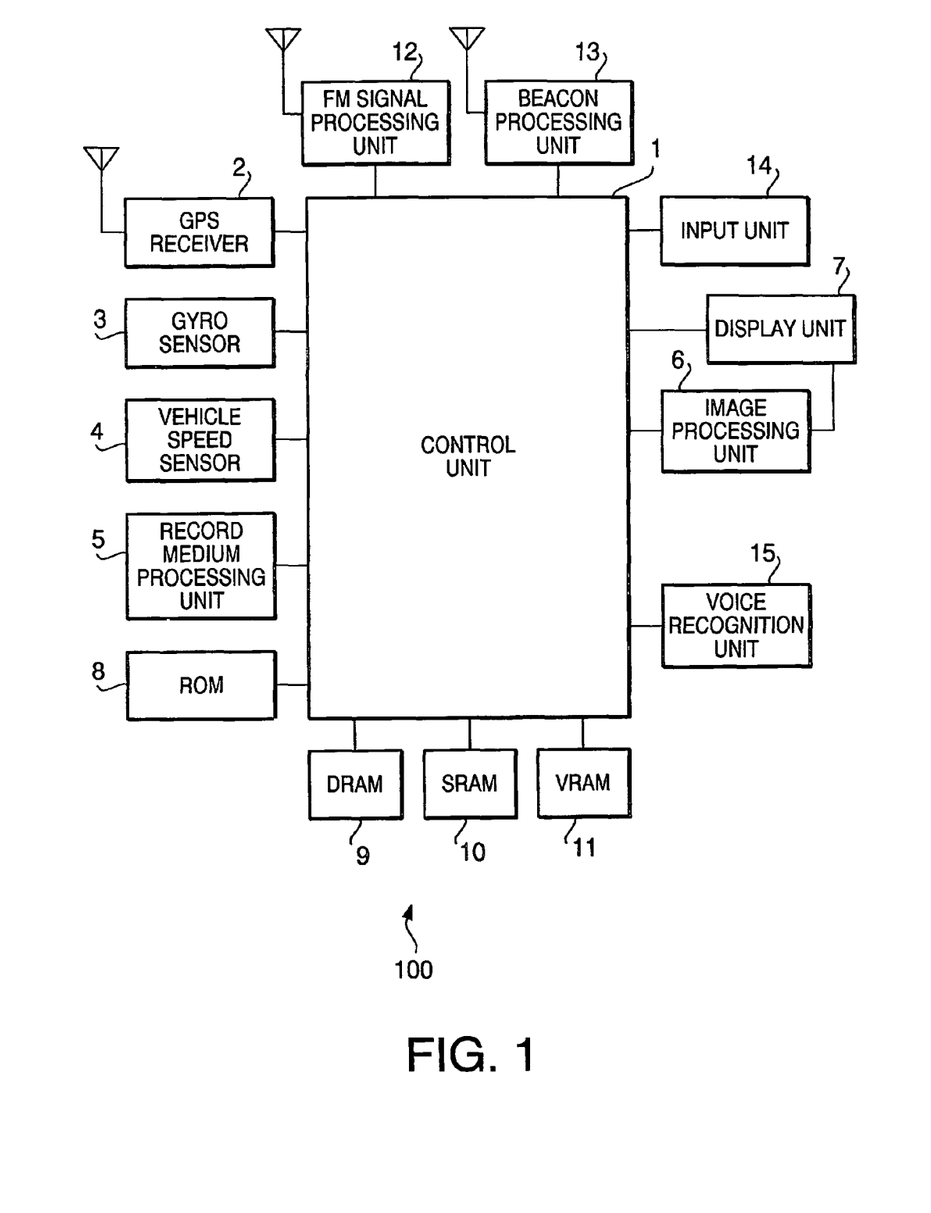
FIG. 1 is a block diagram showing the composition of a vehicle-mounted system including a menu displaying device in accordance with an embodiment of the present invention in accordance with an embodiment of the invention.

FIG. 1 is a block diagram showing the composition of a vehicle-mounted system 100 including a menu displaying device in accordance with an embodiment of the present invention. The vehicle-mounted system 100, having a navigation function and a radio/television function, includes a control unit 1, a GPS (Global Positioning System) receiver 2, a gyro sensor 3, a vehicle speed sensor 4, a record medium processing unit 5, an image processing unit 6, a display unit 7, a ROM (Read Only Memory) 8, a DRAM (Dynamic Random Access Memory) 9, an SRAM (Static Random Access Memory) 10, a VRAM (Video Random Access Memory) 11, an FM signal processing unit 12, a beacon processing unit 13, an input unit 14 and a voice recognition unit 15.

The control unit 1 has centralized control over the whole vehicle-mounted system 100. The GPS receiver 2 receives GPS signals (to be used for obtaining position information) transmitted from GPS satellites and outputs the received signals to the control unit 1. The gyro sensor 3 measures angular speed of the vehicle on which the vehicle-mounted system 100 is mounted and outputs a signal representing the measurement to the control unit 1. The vehicle speed sensor 4 detects revolving speeds of drive wheels on both sides of the vehicle, generates a vehicle speed pulse signal corresponding to the average of the detected revolving speeds, and outputs the vehicle speed pulse signal to the control unit 1. The record medium processing unit 5, storing a record medium such as a CD (Compact Disc) or DVD (Digital Versatile Disc) or being equipped with an HD (Hard Disk) as a record medium, has the function of reading out data stored in the record medium. In this embodiment, digital map data necessary for the navigation function, for example, has been stored in the record medium.

The control unit 1 executes positioning calculation based on the signals outputted by the GPS receiver 2, while executing dead reckoning (i.e. calculation of the direction or traveling direction of the vehicle and distance, hereinafter abbreviated as "DR") based on the signals outputted by the gyro sensor 3 and the vehicle speed sensor 4. Based on the GPS positioning result and the DR positioning result (i.e. the current position and current traveling direction of the vehicle), the control unit 1 drives the record medium processing unit 5, extracts digital map data of an area around the current position of the vehicle from the record medium, and outputs the digital map data to the image processing unit 6. The image processing unit 6 converts the digital map data into analog map data by D/A (digital-to-analog) conversion and outputs the analog map data to the display unit 7 while superimposing a vehicle mark (for indicating the current position of the vehicle) on the analog map data. According to the signal (analog map data) supplied from the image processing unit 6, the display unit 7 displays a map of the area around the vehicle on its screen while displaying the vehicle mark at the center of the screen.

The ROM 8, which is accessed by the control unit 1 when the vehicle-mounted system 100 is started up (turned ON), stores programs to be executed by the control unit 1, various data, etc. The DRAM 9 and the SRAM 10 temporarily store programs and data loaded from the record medium processing unit 5 and the ROM 8, allowing free reading/writing of the programs and data for realizing high speed processing. The SRAM 10, having battery backup, can keep its memory contents while the power is off. The VRAM 11 is capable of retaining an image displayed on the display unit 7.

The FM signal processing unit 12 receives FM multiplex broadcasting signals, for example, extracts a desired signal from the received signals, and processes the extracted signal. The beacon processing unit 13 receives signals transmitted from optical beacons placed along main roads, radio beacons placed along expressways, etc. and processes the received signals. The signals received by the FM signal processing unit 12 and the beacon processing unit 13 may include the VICS (Vehicle Information and Communication System) signal supplied by the VICS center (in Japan), for example.

In this embodiment, the display unit 7 is implemented by a well-known touch panel (of the pressure-sensitive type or the electrostatic type, for example) and thus serves also as an input device. The input unit 14 includes mechanical buttons (including the power switch) arranged on the front of the vehicle-mounted system 100, for example. When the input unit 14 is operated by the user, a signal corresponding to the operation is outputted by the input unit 14 to the control unit 1 and a process corresponding to the signal is executed by the control unit 1. The voice recognition unit 15 (also as a type of input device) recognizes voice of the user received by a microphone (unshown) and outputs a signal corresponding to the result of recognition to the control unit 1. Incidentally, all the operations (instructions) that are possible through the voice recognition unit 15 are also possible through the input unit 14.

Figure 2:
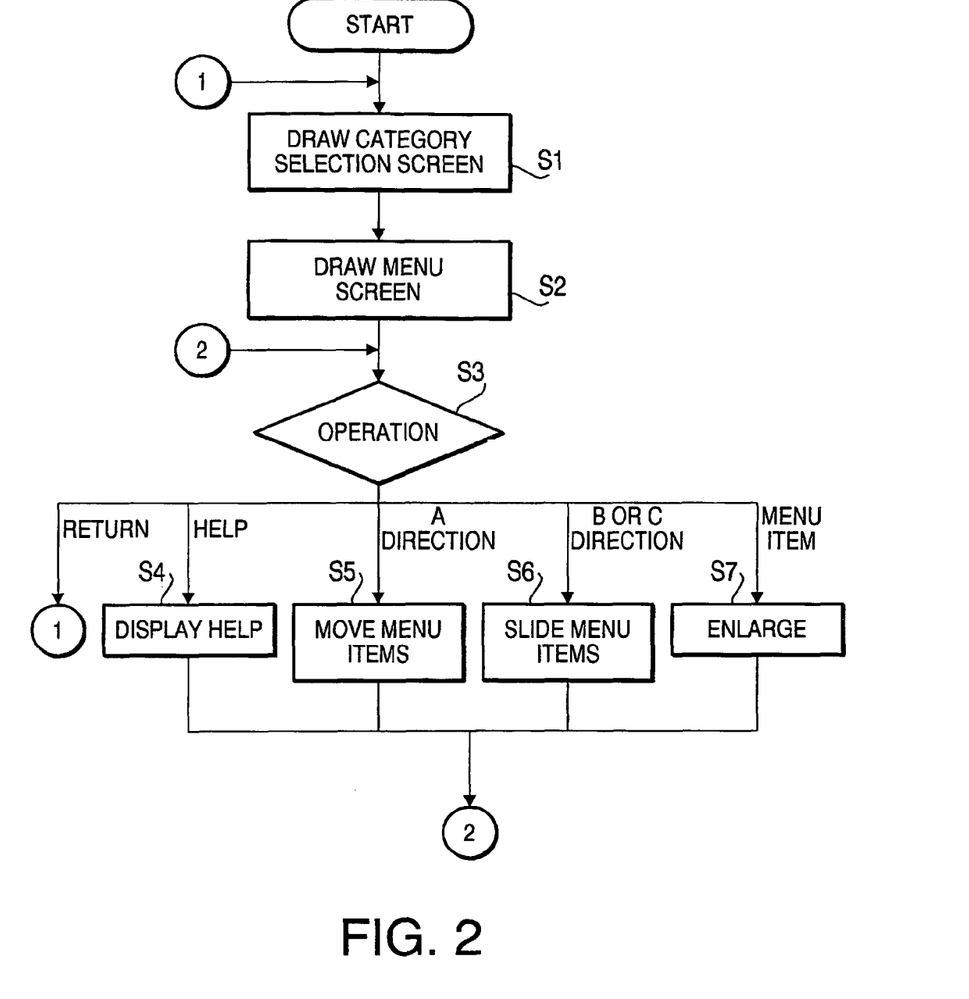
FIG. 2 is a flow chart showing a menu display process executed by the vehicle-mounted system of FIG. 1, in accordance with the embodiment of the invention.

Next, a menu display process which is executed by the vehicle-mounted system 100 of this embodiment when the menu screen is operated by the user will be explained in detail referring to FIG. 2. The menu display process of this embodiment is started when the vehicle-mounted system 100 is started up (turned ON) or when one of the various input devices (the touch panel (display unit 7), the input unit 14 or the voice recognition unit 15) is operated by the user in order to view the menu screen. The menu display process of this embodiment is ended when the vehicle-mounted system 100 is turned OFF or when a different function of the vehicle-mounted system 100 (e.g. the navigation function) is activated.

At the start of the menu display process, prescribed data are read out from the HD of the record medium processing unit 5, the ROM 8, etc. and the image processing unit 6 draws and displays an image for letting the user select a category of menu items (hereinafter called "category selection screen") on the display unit 7 according to the data (step S1). The category selection screen contains a plurality of icons representing different categories. The categories may include "NAVIGATION" (registered points (locations) corresponding to map data, VICS information, etc.), "AUDIO/VISUAL" (equalizer settings, songs registered as favorites, preset radio/TV stations, etc.) and "IMPORT" (data imported from external devices), for example. Menu items contained in the category "IMPORT" may include image data which have been shot by use of digital still cameras (hereinafter abbreviated as "DSCs") of well-known types, for example. The vehicle-mounted system 100 is capable of importing such data from external devices like DSCs via an external input terminal (unshown). The categories to be displayed in this step S1 may be preset at the stage of product shipment or set arbitrarily by the user by operating the various input devices.

Figure 3:
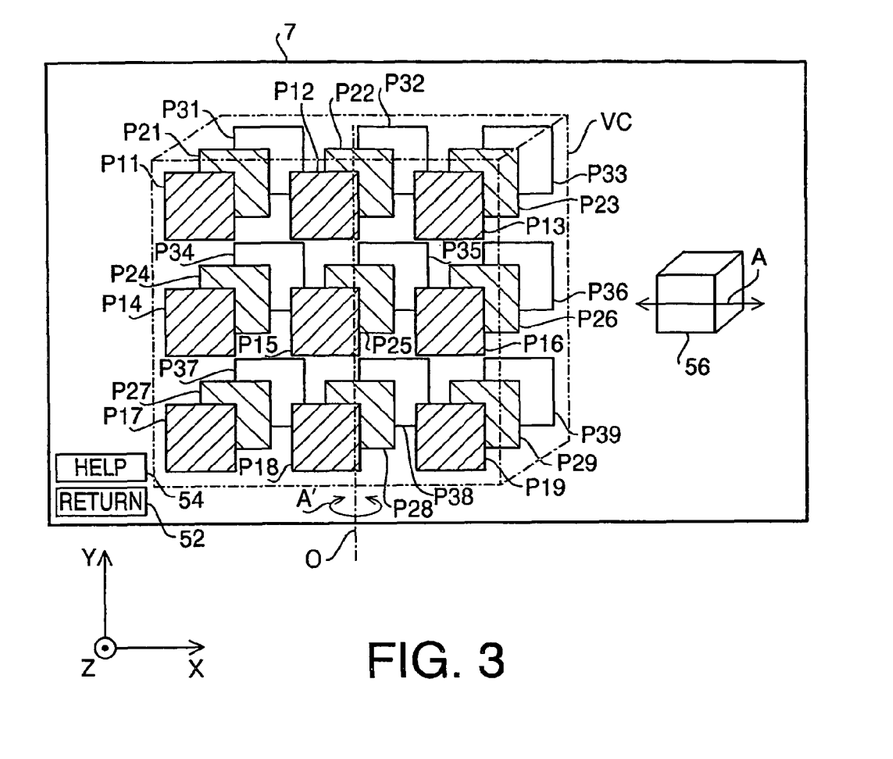
FIG. 3 is a schematic diagram showing an example of a menu screen of the vehicle-mounted system on which menu items are placed at initial positions, in accordance with the embodiment of the invention.

Upon selection of one of the icons (representing the category "IMPORT", for example) from the category selection screen by the user, the image processing unit 6 draws and displays a menu screen like the one shown in FIG. 3 on the display unit 7 (step S2). The menu screen of FIG. 3 contains a total of twenty-seven menu items (pictures in this example) which are arranged in a three-dimensional virtual cube VC. FIG. 3 is a schematic diagram showing an example of the menu screen on which menu items are placed at initial positions. Incidentally, X, Y and Z axes are drawn in figures from FIG. 3 for convenience, in which the X and Y axes are in parallel with the screen of the display unit 7 while the Z axis is orthogonal to the screen of the display unit 7 (i.e. orthogonal to the X and Y axes).

Figure 4:
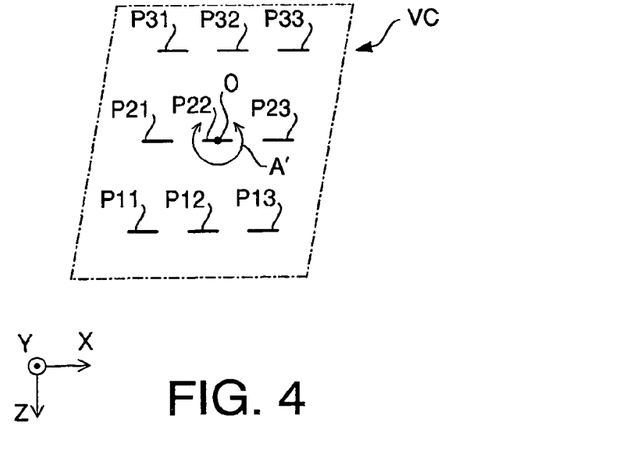
FIG. 4 is a schematic diagram viewing a three-dimensional virtual cube (in which the menu items are arranged) from above, in accordance with the embodiment of the invention.

FIG. 4 is a schematic diagram viewing the three-dimensional virtual cube VC (in which the menu items are arranged) from above (along the Y axis). Each of the twenty-seven menu items is a rectangular picture having substantially no thickness. Each menu item is placed in the three-dimensional virtual cube VC to squarely face the screen of the display unit 7, that is, in parallel with the X-Y plane shown in FIG. 3 to be viewable by the user.

In the initial state, the three-dimensional virtual cube VC includes three virtual layers which are parallel to the X-Y plane and placed at even intervals in the Z axis direction. In each layer, nine menu items are arranged like a matrix (three rows×three columns). Specifically, menu items P11-P19 are arranged in the front layer, menu items P21-P29 are arranged in the middle layer, and menu items P31-P39 are arranged in the rear layer. In FIG. 3, menu items in different layers are provided with different patterns in order to clearly discriminate among the layers (The patterns are irrelevant to actual appearance of the menu items.). The menu items actually displayed are, for example, pictures or images captured by an image capturing device (e.g. DSC).

In the three-dimensional virtual cube VC, each menu item is placed to have at least a part overlapping with none of other menu items placed in front of the menu item, by which every menu item is displayed on the menu screen to expose at least a part as shown in FIG. 3. Therefore, the menu of this embodiment is displayed to let all the menu items be viewable on one screen. The viewability of the menu items will be explained below specifically, taking the menu items P21 and P31 as examples.

The menu item P21 is placed in the middle layer which is to the rear of the menu item P11. The menu item P21 is not placed to totally overlap with the menu item P11. Specifically, the menu item P21 on the screen is shifted from the menu item P11 by prescribed distances in the X and Y directions. The menu item P21 does not overlap with any menu item other than the menu item P11. Therefore, the menu item P21 is displayed on the menu screen to have a part overlapping with the menu item P11 and the remaining part being exposed to be viewable to the user.

The menu item P31 is placed in the rear layer which is to the rear of the menu item P21. The menu item P31 on the screen is also shifted from a menu item in front of itself (i.e. the menu item P21) by prescribed distances in the X and Y directions. The directions and distances of the shift of the menu item P31 from the menu item P21 are equal to those of the shift of the menu item P21 from the menu item P11. Thus, the menu item P31 is shifted from the menu item P21 and also from the menu item P11 in the X and Y directions. While the menu item P31 overlaps also with the menu item P12, the overlap is very small. Therefore, as shown in FIG. 3, the menu item P31 is displayed on the menu screen to have a part overlapping with the menu item P21 (and a negligible part overlapping with the menu item P12) and the remaining part being exposed to be viewable to the user.

Incidentally, the number of menu items displayed on the menu screen is not restricted to twenty-seven. The number can be increased when the screen size of the display unit 7 is relatively large, or decreased when the screen size is relatively small. It is desirable that each menu item displayed on the menu screen has a size enough to let the user touch and operate it without fail (easily and securely).

On the menu screen shown in FIG. 3, a "RETURN" icon 52, a "HELP" icon 54 and a drag icon 56 are also displayed in addition to the menu items P11-P39. The "RETURN" icon 52 is an icon to be touched for returning to a previous screen. When the "RETURN" icon 52 is touched by the user (S3: RETURN), the aforementioned category selection screen is displayed again on the display unit 7. The "RETURN" icon 52 is mainly used when the user erroneously selected a different category.

The "HELP" icon 54 is an icon linked to a help function which has been prepared for users unfamiliar with the operation of the vehicle-mounted system 100 in order to supply auxiliary information for smooth operation of the vehicle-mounted system 100. When the "HELP" icon 54 is touched by the user (S3: HELP), a help screen containing character strings and images explaining the menu operation are displayed in a part of the screen, for example (S4). By reference to such a help screen, the user can perform the menu operation smoothly. When the help screen is closed, the display returns to the menu screen of FIG. 3.

The drag icon 56 is used as an input key for operating the menu items on the menu screen. For example, when the user touches the drag icon 56 with a finger and slides the finger on the drag icon 56 (this action will hereinafter be expressed simply as "dragging") in the direction of the arrow A shown in FIG. 3 (S3: A direction), the menu items on the menu screen are moved to revolve around an axis O (shown in FIGS. 3 and 4) in the direction of an arrow A' (S5). Here, the axis O is a straight line in the Y direction passing through the centers of the menu items P22, P25 and P28. Incidentally, all the twenty-seven menu items stay in parallel with the X-Y plane (to squarely face the screen of the display unit 7) even when they are moved or revolved. Thus, the three menu items P22, P25 and P28 substantially stand still while the other twenty-four menu items surrounding them revolve around the axis O along circular orbits.

For example, when the drag icon 56 is "dragged" leftward in the direction of the arrow A, the image processing unit 6 drawing the menu rotates the drag icon 56 leftward (clockwise when viewed from above) accordingly while revolving the menu items P11-P39 leftward around the axis O (clockwise in FIG. 4) in sync with the rotation of the drag icon 56. On the other hand, when the drag icon 56 is "dragged" rightward in the direction of the arrow A, the image processing unit 6 drawing the menu rotates the drag icon 56 rightward (counterclockwise when viewed from above) accordingly while revolving the menu items P11-P39 rightward around the axis O (counterclockwise in FIG. 4) in sync with the rotation of the drag icon 56.

Figure 5:
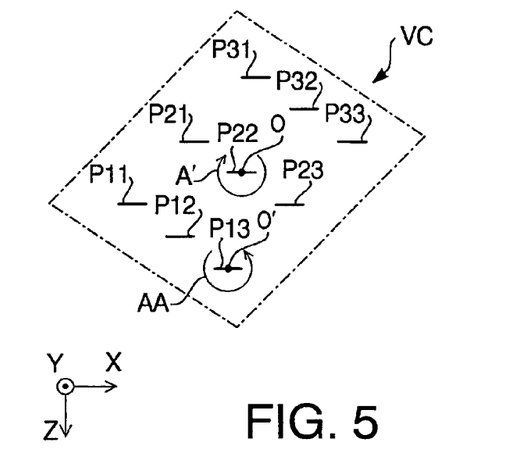
FIG. 5 is a schematic diagram viewing the three-dimensional virtual cube (in which the menu items are arranged) from above and showing a state in which the menu items have been moved from the initial positions, in accordance with the embodiment of the invention.

FIG. 5 is a schematic diagram viewing the three-dimensional virtual cube VC (in which the menu items are arranged) from above and showing a state in which the menu items have been moved from the initial positions. The movement of the menu items will be explained below taking the menu item P13 as an example. When the drag icon 56 is "dragged" leftward in the direction of the arrow A, for example, the menu item P13 moves on a circular orbit around the axis O. Specifically, an axis O' of the menu item P13 moves on the circular orbit while the menu item P13 revolves around the axis O. In other words, the menu item P13 moves so that its axis O' will draw the circular orbit. Incidentally, the axis O' is a straight line in the Y direction passing through the center of the menu item P13.

Meanwhile, the menu item P13 rotates around its own axis O' in the direction of an arrow AA shown in FIG. 5 (counterclockwise in FIG. 5). The angular speed of the rotation of the menu item P13 around its axis O' is exactly opposite (equal in scalar quantity and opposite in sign) to the angular speed of the revolution of the menu item P13 on the circular orbit around the axis O. Therefore, the attitude of the menu item P13 is maintained to squarely face the screen of the display unit 7 even when the menu item P13 is moved or revolved. The other menu items also move in the same way. By the revolution and rotation which have been explained above, all the menu items P11-P39 in this embodiment are moved to revolve around the axis O while squarely facing the screen of the display unit 7.

Incidentally, the traveling distance (angle) of each menu item revolving on the circular orbit around the axis O is set proportional to the time length of the touching of the drag icon 56 or the distance of the "dragging" of the drag icon 56, for example.

Figure 6:
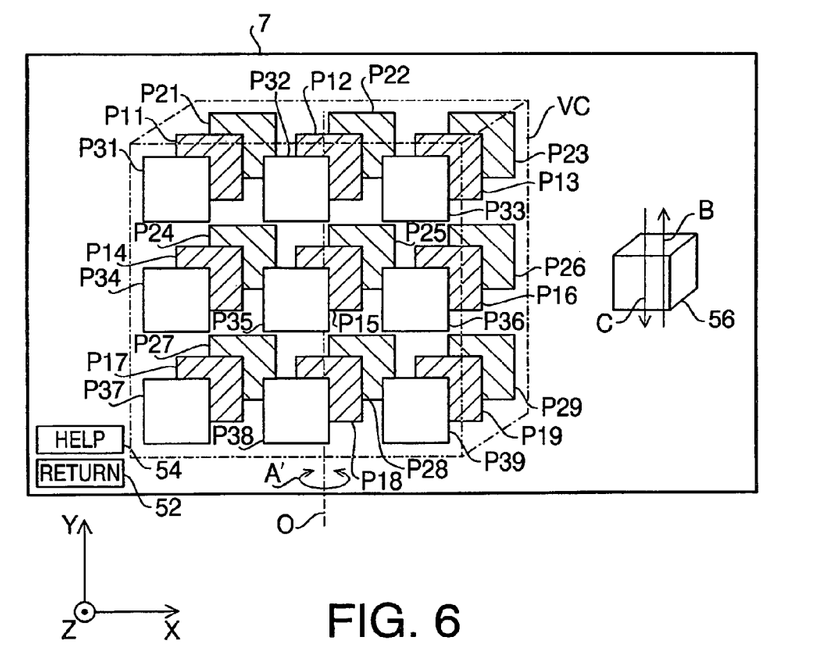
FIG. 6 is a schematic diagram showing another state of the menu items which have been moved from the initial positions, in accordance with the embodiment of the invention.

When the drag icon 56 is "dragged" in the direction of an arrow B shown in FIG. 6 when the menu items P11-P39 are in the state of FIG. 3 (S3: B OR C DIRECTION), the image processing unit 6 drawing the menu rotates the drag icon 56 in the direction of the arrow B accordingly, while sliding or shifting the menu items P31-P39 in the rear layer in FIG. 3 to the front layer, the menu items P11-P19 in the front layer in FIG. 3 to the middle layer, and the menu items P21-P29 in the middle layer in FIG. 3 to the rear layer as shown in FIG. 6 (S6).

On the other hand, when the drag icon 56 is "dragged" in the direction of an arrow C shown in FIG. 6 when the menu items P11-P39 are in the state of FIG. 3 (S3: B OR C DIREC- TION), the image processing unit 6 drawing the menu rotates the drag icon 56 in the direction of the arrow C accordingly, while sliding or shifting the menu items P21-P29 in the middle layer in FIG. 3 to the front layer, the menu items P31-P39 in the rear layer in FIG. 3 to the middle layer, and the menu items P11-P19 in the front layer in FIG. 3 to the rear layer (S6).

In the arrangement which has been described above, all the menu items P11-P39 are displayed to squarely face the screen of the display unit 7, and thus even menu items placed rearward can be clearly viewed and recognized by the user. Therefore, menu items having high viewability can be displayed on one screen in a large number, by which the user is allowed to visually and intuitively grasp and recognize the correlations among the menu items with ease. Further, since the menu items are moved in sync with the movement of the drag icon 56 as the input key, high operability and fine operational feel of the menu are realized.

When one of the menu items P11-P39 is touched by the user (S3: MENU ITEM), the image processing unit 6 drawing the menu enlarges the touched menu item (S7), by which the user can refer to the desired menu item in a size enough for a detailed check. When the "RETURN" icon 52 is touched in this state, the display returns to the menu screen like the one shown in FIG. 3 or 6.

Here, an example of the operation of the vehicle-mounted system 100 when a category other than the "IMPORT" is selected by the user will be explained briefly. When the "NAVIGATION" is selected from the category selection screen, for example, a menu containing menu items regarding the registered points (locations) and VICS information (e.g. character strings representing such information) are displayed on the menu screen. Such menu items move in sync with the movement of the drag icon 56 as explained above. When one of the menu items displayed on the menu screen is touched by the user, the control unit 1 lets the record medium processing unit 5 read out proper map data from the record medium, controls the image processing unit 6 to let it display a map around the selected registered point on the display unit 7, and executes a route calculation for the navigation from the current position of the vehicle (determined based on the GPS signals) to the registered point, for example. In this case, the menu display process is ended and a well-known navigation process is started, for example.

In the menu displayed by the vehicle-mounted system 100 which has been explained above, all the menu items stay in parallel with the X-Y plane to squarely face the screen of the display unit 7 even when they are operated by the user in various ways. In other words, no menu item is placed obliquely with respect to the X-Y plane like the menu items on the top and side surfaces of the cubic menu of the aforementioned patent document #1. Therefore, all the menu items (pictures, character strings, etc.) on the menu can be displayed with no distortion, invariably maintaining excellent viewability. Further, all the menu items can be constantly displayed on one screen, without being hidden like the menu items on the three hidden surfaces of the cubic menu of the patent document #1.

It is possible to configure the menu to constantly revolve the menu items on the circular orbits around the axis O at a very low speed while no operation is performed by the user. In this configuration, every menu item (except the three menu items placed on the axis O) necessarily comes to the front of the menu periodically even when there is no operation by the user, by which the user is allowed to view each menu item perfectly (with no menu items screening the menu item) without the need of operating the menu.

It is also possible to set each menu item in a selectable state or in a non-selectable state depending on the size of the menu item displayed on the menu screen (depending on whether or not the menu item has a prescribed size enough for the user to touch it with a finger easily and securely, for example). With this configuration, menu items at the front of the menu (screened by no menu item) can be set in the selectable state while setting menu items placed rearward (which can have a part screened by another menu item) in the non-selectable state. In this configuration, even when the user touches a menu item that is screened partially, the menu item is not enlarged by the image processing unit 6.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims. For example, various modifications (other embodiments) are possible in regard to the movement of the menu items. Such embodiments will be described below, in which names and reference characters identical with those in the above embodiment designate elements identical or equivalent to those of the above embodiment and thus repeated description thereof is omitted for brevity.

Figure 7:
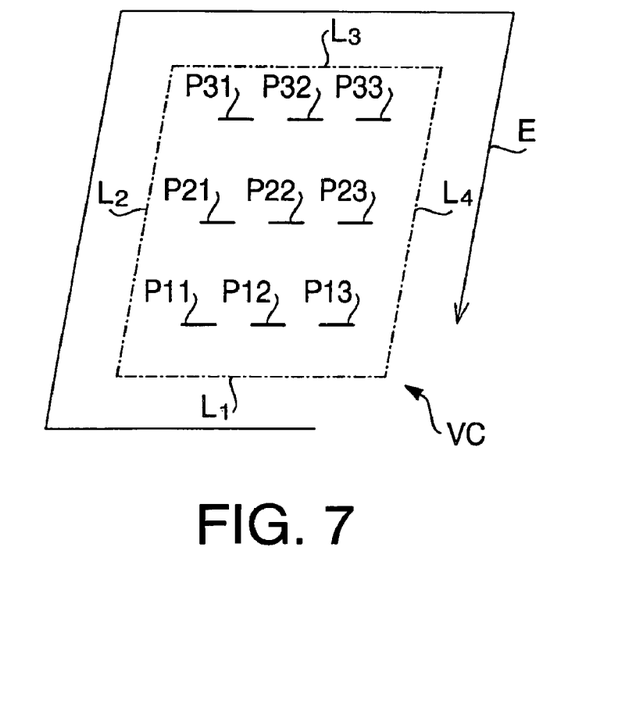
FIG. 7 is a schematic diagram for explaining the movement of menu items in accordance with another embodiment of the present invention.

FIG. 7 is a schematic diagram for explaining the movement of menu items in accordance with another embodiment of the present invention. In the embodiment shown in FIG. 7, when the drag icon 56 is "dragged" leftward in the direction of the arrow A shown in FIG. 3, for example, each menu item moves in the direction of an arrow E shown in FIG. 7 (clockwise in FIG. 7). The movement will be explained below taking the menu item P13 as an example. Incidentally, four virtual surfaces of the three-dimensional virtual cube VC in parallel with the Y axis will be indicated with reference characters "$L_1$", "$L_2$", "$L_3$" and "$L_4$" for convenience.

In the embodiment of FIG. 7, each menu item moves along the nearest one of the four virtual surfaces $L_1$, $L_2$, $L_3$ and $L_4$ while squarely facing the screen of the display unit 7. In the example of FIG. 7, the menu item P13 moves in the direction of the "dragging" of the drag icon 56 (clockwise in FIG. 8) along the virtual surface $L_1$ which is the nearest to the menu item P13.

As the menu item P13 moves along the virtual surface $L_1$ according to a continuous operation by the user to the drag icon 56, the menu item P13 approaches the virtual surface $L_2$ and eventually, the virtual surface $L_2$ becomes one that is the nearest to the menu item P13. At this point, the menu item P13 starts moving along the virtual surface $L_2$ in the direction of the arrow E. When the operation to the drag icon 56 is continued by the user, the menu item P13 keeps on moving in the direction of the arrow E (successively along the virtual surfaces $L_2$, $L_3$, $L_4$, $L_1$, . . . ).

In this embodiment, each menu item moves linearly along each virtual surface. Incidentally, the menu items P22, P25 and P28 (at the same distance from the four virtual surfaces) substantially stand still at the original positions even when the drag icon 56 is "dragged" rightward or leftward.

Figure 8:
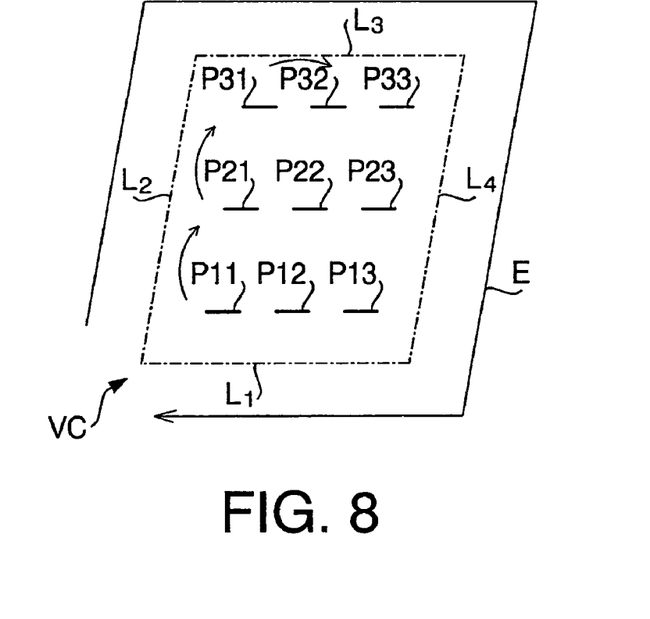
FIG. 8 is a schematic diagram for explaining the movement of menu items in accordance with still another embodiment of the invention.

FIG. 8 is a schematic diagram for explaining the movement of menu items in accordance with still another embodiment of the present invention. While the movement of menu items is continuous in the above embodiments, the menu items in this embodiment (FIG. 8) are designed to move discretely. For example, when the drag icon 56 is "dragged" leftward in the direction of the arrow A shown in FIG. 3, each menu item moves discretely in the direction of the arrow E shown in FIG.

8 (clockwise in FIG. 8). The movement will be explained below taking the menu item P11 as an example.

In the embodiment of FIG. 8, each menu item moves discretely along the nearest one of the four virtual surfaces $L_1$, $L_2$, $L_3$ and $L_4$ while squarely facing the screen of the display unit 7. The menu item P11 moves from the position shown in FIG. 8 to the position of the menu item P21 along the virtual surface $L_2$ which is the nearest to the menu item P11. At the same time, the menu item P21 similarly moves to the position of the menu item P31 along the virtual surface $L_2$ which is the nearest to the menu item P21. Similarly, each menu item moves to the position of the next menu item along the nearest virtual surface.

When the drag icon 56 is operated continuously by the user, the menu item P11 discretely and successively moves to the positions of the menu items P21, P31, P32, ... and other menu items move discretely and successively in similar manners. As above, each menu item in this embodiment moves discretely to the position of the next menu item along the nearest virtual surface. Incidentally, similarly to the above embodiments, the menu items P22, P25 and P28 (at the same distance from the four virtual surfaces) substantially stand still at the original positions even when the drag icon 56 is "dragged" rightward or leftward. In order to let the menu items P22, P25 and P28 be movable like the other menu items, the user can slide or shift the menu items P22, P25 and P28 forward or backward by "dragging" the drag icon 56 in the direction of the arrow C or B shown in FIG. 6 as mentioned above.

Incidentally, while the above embodiments have been described taking the three-dimensional virtual cube VC as an example of a three-dimensional virtual body in which the menu items are arranged, the menu items may also be arranged in a three-dimensional virtual body of a different shape (rectangular prism, circular cylinder, globe, etc.).

What is claimed is:

1. A menu displaying device which displays a menu containing a plurality of menu items on a display screen, comprising:
    a display unit capable of displaying the menu on the display screen as a three-dimensional menu;
    a menu item arrangement unit, which is capable of executing the steps of:
        defining a plurality of layers which are included in a prescribed three-dimensional virtual body; and
        arranging the plurality of menu items on the plurality of layers so that each of said layers has at least two menu items, the plurality of menu items being arranged such that each menu item on one of the plurality of layers is not completely covered with each menu item on the other of the plurality of layers, thereby each menu item having at least a viewable part that is not screened by other menu items in front of the menu item; and
    an icon displaying unit which displays an icon, having a same shape as the three-dimensional virtual body, as an input key to be operated by a user for specifying the movement of the menu items, on the display screen;
    an icon moving unit which rotates the icon displayed on the display screen according to the operation by the user to the icon; and
    a menu item moving unit which moves, in sync with the rotation of the icon, the plurality of menu items in the three-dimensional virtual body on a circular orbit around a prescribed axis in the three-dimensional virtual body in the same direction as the rotation of the icon at a predetermined angular speed, and rotates each menu item around its own axis in a direction opposite to the direction of the menu items on the circular orbit at the predetermined angular, speed, resulting in each of the plurality of menu items in the three-dimensional virtual body revolving on the circular orbit around the prescribed axis in the three-dimensional virtual body while remaining squarely facing the display screen of the display unit during the revolution.

2. The menu displaying device according to claim 1, including a menu item moving unit which moves each menu item along a prescribed virtual surface of the three-dimensional virtual body.

3. The menu displaying device according to claim 1, including a menu item moving unit which discretely moves each menu item to a position of an adjacent menu item substantially along a virtual surface of the three-dimensional virtual body.

4. The menu displaying device according to claim 1, further comprising a menu item selectability setting unit which sets each menu item in a selectable state or a non-selectable state depending on the size of the menu item displayed on the display screen.

5. The menu displaying device according to claim 4, wherein the menu item selectability setting unit sets each menu item in the selectable state or the non-selectable state depending on whether or not the menu item has a prescribed size enough for letting a user select the menu item.

6. The menu displaying device according to claim 1, wherein the menu items are replaceably arranged on a menu item by menu item basis.

7. The menu displaying device according to claim 1, wherein the menu items are of substantially the same size.

8. The menu displaying device according to claim 1, wherein said plurality of menu items displayed on each of the plurality of layers appear to extend (1) equidistantly along a first axis parallel to the front side of the display screen, (2) equidistantly along a second axis parallel to the front side of the display screen and perpendicular to the first axis and (3) equidistantly along said orthogonal axis, which is orthogonal to the front side of the display screen.

* * * * *

UNITED STATES PATENT AND TRADEMARK OFFICE
CERTIFICATE OF CORRECTION

| | |
|---|---|
| PATENT NO. | : 8,046,714 B2 |
| APPLICATION NO. | : 11/377775 |
| DATED | : October 25, 2011 |
| INVENTOR(S) | : Takao Yahiro et al. |

It is certified that error appears in the above-identified patent and that said Letters Patent is hereby corrected as shown below:

Title Page, Item (56) Foreign Patent Documents

--JP HEI 11-23193-- should read

--JP HEI 11-231993--

Signed and Sealed this
Sixth Day of March, 2012

David J. Kappos
*Director of the United States Patent and Trademark Office*